Patented Oct. 24, 1922.

1,432,858

UNITED STATES PATENT OFFICE.

HARRY HEY, OF MELBOURNE, VICTORIA, AUSTRALIA.

RECOVERY OF LEAD AND SILVER FROM ORES AND METALLURGICAL PRODUCTS.

No Drawing.  Application filed February 24, 1920. Serial No. 360,829.

*To all whom it may concern:*

Be it known that I, HARRY HEY, a subject of the King of Great Britain, residing at care of Electrolytic Zinc Company of Australasia Proprietary Limited, of Collins House, 360–366 Collins Street, Melbourne, in the State of Victoria, Commonwealth of Australia, have invented certain new and useful Improvements in the Recovery of Lead and Silver from Ores and Metallurgical Products, of which the following is a specification.

This invention relates to the recovery of lead and silver from ores and metallurgical products and refers more particularly to the treatment of material in which the lead and silver are contained as chloridized products associated with sulphides of other metals.

There are various known processes for converting these metals into chlorides, such chlorides being subsequently leached out by suitable solvents such as hyposulphite of soda brine, or the like.

It has been found however, that in the operation of these processes substantial losses have been incurred mainly in the leaching treatment which is believed to be due to the tendency of the chlorides of these metals (particularly in the case of silver) to revert to sulphides in the presence of other metal sulphides such as sulphide of zinc.

One of the known methods of treating sulphide ores is to mix the said ores with the requisite quantity of zinc chloride to chloridize the lead and silver present and to heat the said mixture without access of air in a closed vessel. The extraction of the lead and silver simultaneously from the chloridized product has then been effected by leaching with a cold solution (such as brine or sodium-thiosulphite) under such conditions that the contact between the ore and the solution was reduced to a minimum or alternatively with a cold brine solution containing a substance which has a chloridizing effect (such as ferric chloride).

When it was desired to extract the lead separately from the silver the chloridized product was first leached with a solution (such as hot concentrated brine) containing a small proportion of zinc chloride and then subsequently extracting the silver by leaching with a brine solution containing a small percentage of ferric chloride.

These methods of operation are all open to serious objections. In the cold brine extraction (with or without ferric chloride) of the metals simultaneously necessitate chemical precipitation to recover a comparatively small quantity of lead from a large volume of solution. On the other hand the extraction of the lead first with hot brine containing zinc chloride has the disadvantage that the zinc chloride causes a reduction in the solubility of the lead chloride, and in any case it is a process that entails the use of two solutions for leaching i. e., a hot brine containing zinc chloride for the lead and a cold brine containing ferric chloride for extracting the silver. Attempts to use a hot brine solution under similar conditions to the cold brine previously referred to have not hitherto been successful. In leaching with a hot brine using thin layers, practically no extraction at all was effected, whereas in leaching with a hot brine containing ferric chloride under ordinary methods of percolation the percentage of silver left in the residues progressively increased towards the lower layers. This is well illustrated by the following example. A zinc concentrate containing 8 ozs. of silver and 6% of lead was mixed with a 30% excess of zinc chloride over and above the amount necessary to chloridize the lead and silver present. The mixture was then heated in a closed furnace and the product was leached by percolating hot brine (90° C.) containing ferric chloride equivalent to 3 grams of iron per litre through a bed of material 14" in depth. After leaching the residues were assayed which showed that although the extraction of lead was satisfactory the silver contents varied from 1.2 ozs. per ton in the upper layers up to 17.2 ozs. near the centre, whereas the bulk residues assayed 7.6 ozs. per ton. These results clearly indicate that practically none of the silver had been extracted from the ore and that silver dissolved from the upper layers had been precipitated towards the centre.

The object of this invention is to provide certain improvements in the treatment of chloridized products of lead and/or silver whether obtained by the above mentioned process or otherwise whereby the extraction of the lead chloride and particularly the silver chloride may be effected without appreciable losses by avoiding the reversion of the metal chlorides into sulphides.

We accomplish this object by the use of a leaching solution consisting of hot brine containing a small percentage of ferric chloride (e. g. from 5 to 10 grams of ferric chloride per litre) or other reagent capable of yielding chloride or having a chloridizing effect in carrying out the leaching under such conditions that the period of contact between the solutions and the ore is reduced to a minimum.

In carrying this invention into effect the leaching may be accomplished upon a continuously moving belt filter or upon filter beds having shallow layers of ore means being provided (such as suction or pressure) for causing the solution to pass rapidly through the bed of ore and thereby reduce the period of contact to a minimum. Or alternatively the chloridized ore may be first mixed with the leaching solution and the mixture fed to a centrifugal machine by which the liquid is separated from the solid and the period of contact therebetween reduced to a minimum. Or as another alternative the ore in a pulpy condition may be fed to a centrifugal machine and the leaching solution introduced thereto whilst the machine is in motion, the speed being adjusted to give the requisite contact between the liquor and the ore to ensure the solution of the chlorides of lead and silver.

The reagent added to the hot brine used for leaching may be ferric chloride, or cupric chloride, or other substance capable of yielding chlorine or alternately these substances may be formed in situ, for example, if the materials being treated contain acid soluble ferric compounds the addition of a small amount of hydrochloric acid will result in a satisfactory extraction.

It is to be understood that the expression "minimum period of contact" as used throughout this specification means a period of contact long enough to extract the metal values but of so short a duration that reversion is largely if not completely prevented. It will of course be appreciated that some methods of filtration are not capable of giving this required minimum period of contact that is to say "their minimum period" does not fulfil the requirements above set out.

The term hot as used in this specification in relation to the temperature of the brine solution means a temperature at which the brine can dissolve a substantial amount of lead chloride in excess of the amount that can be dissolved in brine at the normal temperature.

The following examples clearly illustrate suitable methods of operation. A Broken Hill zinc concentrate containing 8 ozs. of silver and 6% of lead was mixed with a 30% excess of zinc chloride over and above the amount required to chloridize the lead and silver present. The mixture was then furnaced in a closed furnace so converting the lead and silver into chlorides. A weight of 200 lbs. of this furnaced material was made into a pulp with 20 gallons of cold water and run into a centrifuge of the hypo-extractor type. This machine was 30" in diameter, was provided with a copper basket and was rotating at the rate of 320 R. P. M. After running for a short period the water was driven out of the material, leaving a cake 2½" in thickness. The lead and silver values were then extracted by applying 40 gallons of a leaching solution containing 24% of sodium chloride, ferric chloride equivalent to 3 grams of iron per litre and saturated in the cold with lead chloride. The temperature of the solution was 90° C. and the time occupied in leaching (i. e. the minimum period of contact) was 7 minutes. After washing with water the residues contained only 1 oz. of silver per ton and .15% of lead.

In another example a Broken Hill zinc concentrate also containing 8 ozs. of silver per ton and 6% of lead was treated in a similar manner to the previous example except that 9 ccs. of commercial hydrochloric acid was added per litre of the brine in lieu of the ferric chloride. The residues obtained contained 1.4 ozs. of silver and .2% of lead.

I claim:

1. In the recovery of silver or silver and lead from ores and metallurgical products wherein these metals are contained in the form of chlorides leaching such chloridized products with a hot brine solution containing a substance having a chloridizing effect (such as ferric chloride) such leaching being carried out under such conditions that the period of contact between the solvent and the material is reduced to a minimum whereby reversion of the silver chloride by reaction with sulphides present is avoided.

2. In the recovery of silver or silver and lead from ores and metallurgical products wherein these metals are contained in the form of chlorides leaching such chloridized products with a hot brine solution containing ferric chloride; the leaching being carried out under such conditions that the period of contact between the solvent and the material is reduced to a minimum whereby reversion of the silver chloride by reaction with sulphides present is avoided.

3. In the recovery of silver or silver and lead from ores and metallurgical products wherein these metals are contained in the form of chlorides leaching such chloridized products with a hot brine solution containing a substance which on coming in contact with the material being leached forms a substance having a chloridizing effect, the leaching being carried out under such conditions that the period of contact between the solvent and the material is reduced to a minimum whereby reversion of the silver chloride by reaction with sulphides present is avoided.

4. In the recovery of silver or silver and lead from ores and metallurgical products wherein these metals are contained in the form of chlorides leaching such chloridized products with a hot brine solution containing a substance capable of yielding chlorine, the leaching being carried out under such conditions that the period of contact between the solvent and the material is reduced to a minimum whereby reversion of the silver chloride by reaction with sulphides present is avoided.

5. In the recovery of silver and lead from ores and metallurgical products herein these metals are contained in the form of chlorides leaching such chloridized products with a hot brine solution containing a small proportion of ferric chloride; the leaching being carried out under such conditions that the period of contact between the solvent and the material is reduced to a minimum whereby reversion of the silver chloride by reaction with sulphides present is avoided, allowing the solution to cool, separating the crystallized lead chloride, and then recovering silver from the cold brine.

6. A method for the recovery of lead and silver from ores and metallurgical products comprising mixing the ore with zinc chloride, heating the mixture in a closed furnace whereby the lead and silver are converted into chlorides, washing out the unaltered excess of zinc chloride, and then leaching the chloridized products with a hot brine solution containing a small proportion of ferric chloride, the leaching being carried out under such conditions that the period of contact between the solvent and the material is reduced to a minimum whereby reversion of the silver chloride by reaction with sulphides present is avoided allowing the solution to cool, separating the crystallized lead chloride, and recovering silver from the cold brine.

7. A method for the recovery of lead and silver from ores and metallurgical products comprising mixing the ore with zinc chloride, heating the mixture in a closed furnace whereby the lead and silver are converted into chlorides, washing out the unaltered excess of zinc chloride, then leaching the chloridized products with a hot brine solution containing a substance capable of yielding chlorine, the leaching being carried out under such conditions that the period of contact between the solvent and the material is reduced to a minimum whereby reversion of the silver chloride reduced to a minimum whereby reversion of the silver chloride by reaction with sulphides present is avoided; allowing the solution to cool, separating the crystallized lead chloride, and recovering silver from the cold brine.

In testimony whereof I have signed my name to this specification in the presence of two subscribing witnesses.

HARRY HEY.

Witnesses:
 CLEM A. HACK,
 G. CULLEN.